United States Patent [19]

Geisen et al.

[11] Patent Number: 5,374,020

[45] Date of Patent: Dec. 20, 1994

[54] SELF-BLOCKING ATTACHMENT MEMBER AND SECUREMENT DEVICE COMPRISING SAID ATTACHMENT MEMBER

[75] Inventors: Pierre Geisen, Strasbourg; Andre R. Liebtag, Noisseville, both of France

[73] Assignee: Soprema (Societe Anonyme), Strasbourg, France

[21] Appl. No.: 9,750

[22] Filed: Jan. 27, 1993

[30] Foreign Application Priority Data

Jan. 29, 1992 [FR] France ................. 92 01148

[51] Int. Cl.⁵ .............................................. A47K 1/00
[52] U.S. Cl. ........................... 248/220.2; 52/309.11; 52/309.14; 52/795
[58] Field of Search ............ 52/309.1, 309.11, 309.44, 52/795, 809; 248/220.2, 222.2, 222.3, 225.1, 225.2

[56] References Cited

U.S. PATENT DOCUMENTS

| | | |
|---|---|---|
| 3,524,666 | 8/1970 | Schilf et al. |
| 4,283,896 | 8/1981 | Fricker et al. .............. 52/309.11 X |
| 4,774,119 | 9/1988 | Imhoff ...................... 52/309.11 X |
| 5,085,389 | 2/1992 | Levesque .................... 248/220.2 X |

FOREIGN PATENT DOCUMENTS

| | | |
|---|---|---|
| 3660971 | 6/1973 | Australia . |
| 26052152 | 5/1986 | Germany . |
| 0012318 | of 1905 | United Kingdom . |

*Primary Examiner*—Ramon O. Ramirez
*Attorney, Agent, or Firm*—Young & Thompson

[57] ABSTRACT

Attachment member adapted to be mounted on supports or load-bearing elements of the type of ribbed sheet metal. It includes a tubular body (2) provided with connection structure (3) and an anchoring element (4, 5) on one of the ends of the tubular body (2) and extending perpendicularly relative to this latter. The anchoring element is made up of a straight rod portion (4) and an elbowed rod portion (5), of L shape, disposed on opposite sides of the tubular body (2). A plate (13) has a central connector (14) that screws into the connection structure (3) to retain insulating panels (15). A sealing sheet (16) is adhesively secured to the plates (13) and insulating panels (15).

6 Claims, 2 Drawing Sheets

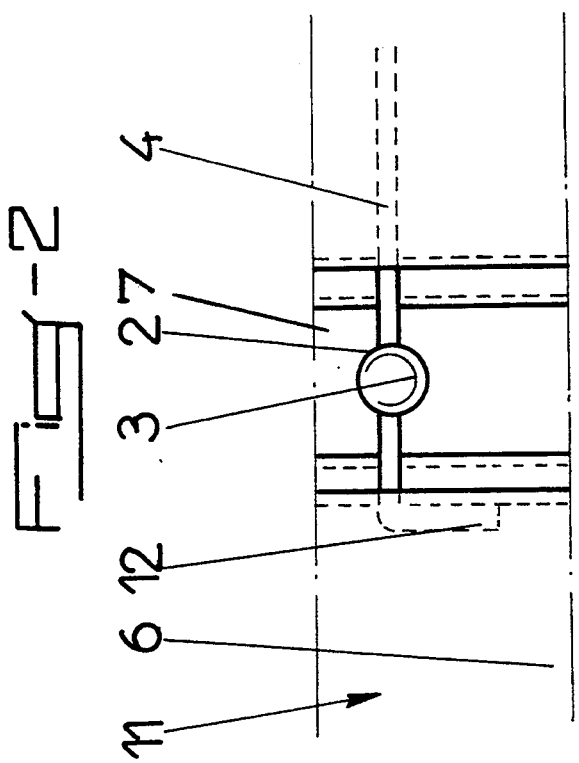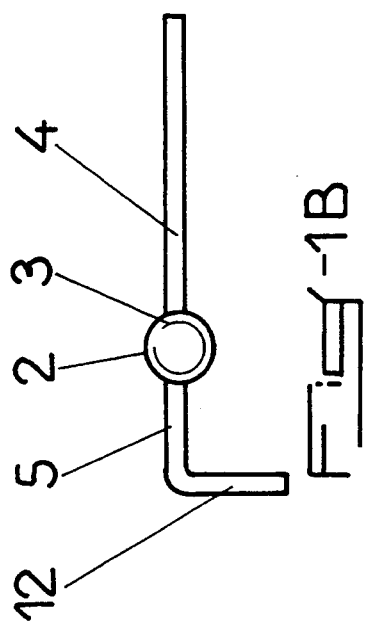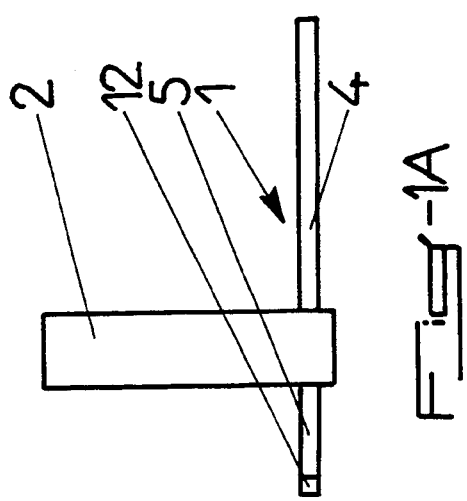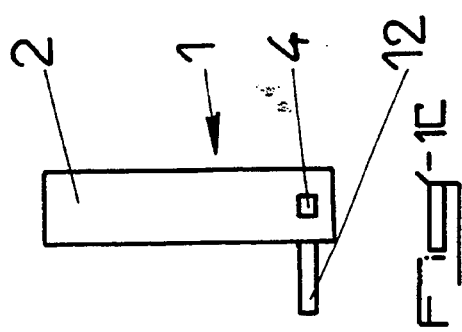

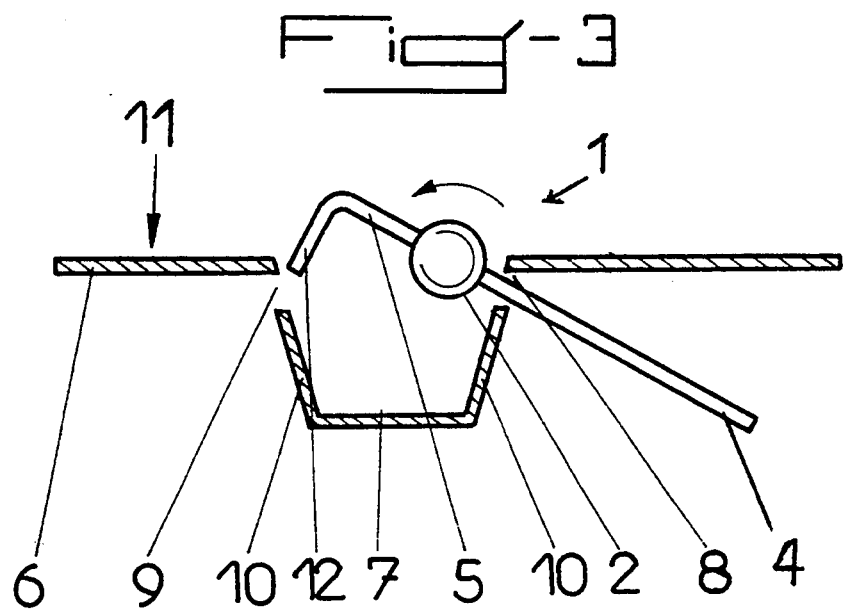
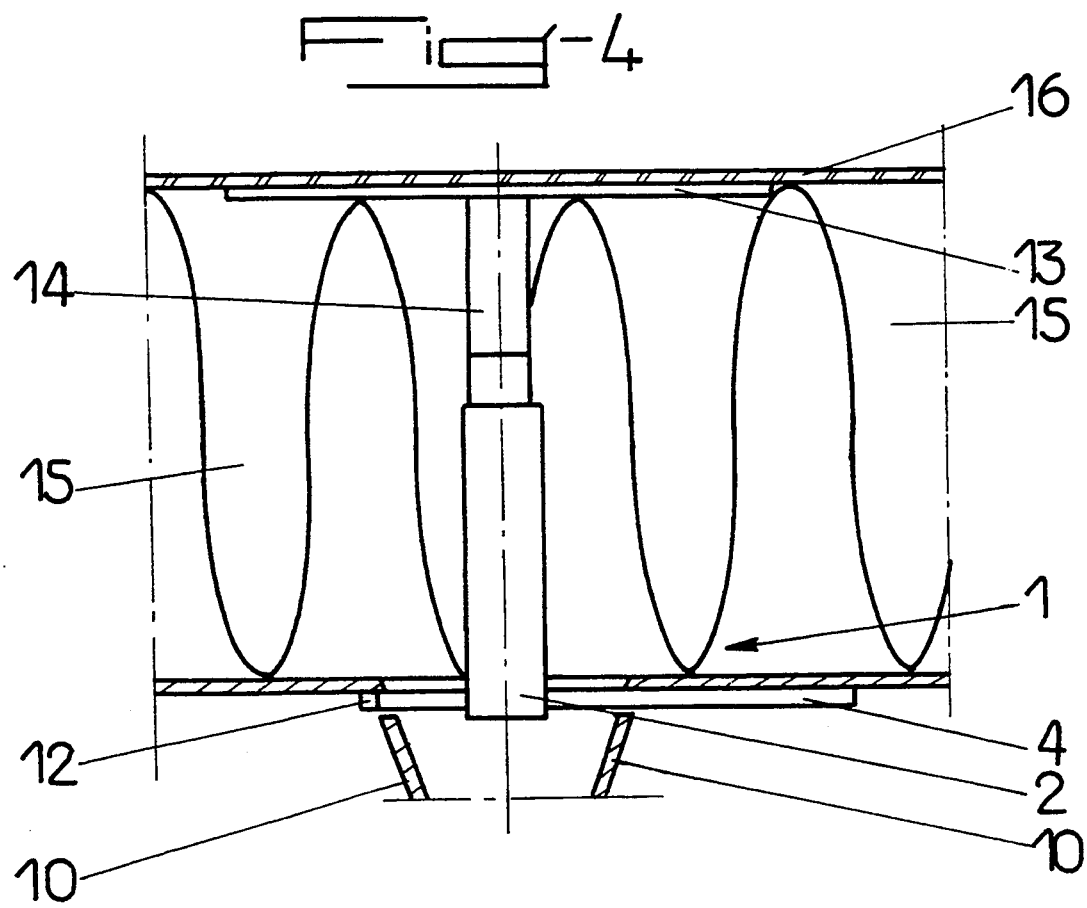

SELF-BLOCKING ATTACHMENT MEMBER AND SECUREMENT DEVICE COMPRISING SAID ATTACHMENT MEMBER

The present invention relates to the securement of elements and/or members on supports or thin load-bearing elements in the form of ribbed profiles, generally of steel sheet and known as steel receptacles, and has for its object a self-blocking attachment member adapted to be emplaced on a support of this type and a securement device for insulating panels comprising said attachment member.

At present, the securement of elements or members on supports of the type described above is usually effected by means of screws, self-tapping or coacting with corresponding nuts, constituting very localized anchoring points on a relatively thin support, which cannot individually resist high tractive or tearing forces.

As a result, to obtain securement having sufficient resistance, it is necessary either to use a very large number of screws fixed to the profiled support, or to use fewer screws but of larger size, in the subjacent framework elements, by generally interposing complicated and costly securement accessories.

The problem addressed by the present invention consists in conceiving securement means for elements and/or members on a support or on load-bearing elements of the ribbed sheet metal type, permitting obtaining a very high resistance to tearing at each securement point, without requiring the implantation in underlying framework elements of load-bearing elements, nor the use of supplemental securement accessories.

Moreover, said securement means should be quick and easy to use, without involving piercing, screwing or bolting operations for its emplacement at the work sites and requiring no supplemental separate element, nor any tool for its assembly with the support or load-bearing elements of ribbed sheet metal.

Furthermore, said securement means should permit providing a device for the emplacement of insulating panels and of a sealing layer on the load-bearing elements, having very high resistance to tearing off, while using a reduced number of separate securement elements.

This problem is nicely solved thanks to a self-blocking attachment member adapted to be mounted on supports or load-bearing elements of the ribbed sheet metal type, characterized in that it is principally constituted, on the one hand, by a tubular body provided with connection means and, on the other hand, by an anchoring element on one of the ends of said tubular body and extending perpendicularly to this latter, said anchoring element being comprised by a straight rod portion and an elbowed rod portion, of L shape, disposed on opposite sides of said tubular body.

The invention will be better understood from the following description, which relates to a preferred embodiment, given by way of non-limiting example, and explained with reference to the attached schematic drawings, in which:

FIGS. 1A–C show respectively front elevational, top plan and side elevational views of the attachment member according to the invention;

FIG. 2 is a plan view of the attachment member shown in FIG. 1A after its mounting on a ribbed load-bearing element;

FIG. 3 is a side elevational view of the attachment member shown in FIG. 1A in the course of mounting on a ribbed load-bearing element; and FIG. 4 is a cross-sectional view showing the use of a securement device for insulating panels on load-bearing elements, comprising the attachment member shown in FIGS. 1A–1C.

According to the invention, and as shown particularly in FIGS. 1A–1C, the attachment member 1 is principally constituted, on the one hand, by a tubular body 2 provided with connection means 3, and, on the other hand, by an anchoring element 4, 5 on one of the ends of said tubular body 2 and extending perpendicularly relative to this latter, said anchoring element being comprised by a straight rod portion 4 and an elbowed rod portion 5, of L shape, disposed on opposite sides of said tubular body 2.

The tubular body 2 could have cross sections, solid or not, of various shapes, namely, square, circular or otherwise, as also can the rod portions constituting the anchoring element 4, 5, their dimensions as well as their constructional material, metallic and/or synthetic, depending on the conditions of use as well as the desired strength.

Nevertheless, the anchoring element 4, 5 will preferably have a square section, solid or hollow.

The anchoring element 4, 5 could be either of two independent rod portions 4 and 5, or of two portions 4 and 5 which are of a single member, passing through the tubular body 2 at a corresponding hole, securement of said rod portions 4 and 5 to the tubular body 2 being preferably achieved by welding.

The tubular body 2 could constitute a male or female assembly element for the elements and/or members to be secured comprising connection means adapted to cooperate with connection means 3 of said tubular body 2.

Said connection means 3 are preferably disposed at the end of the tubular body 2 opposite the anchoring element 4, 5 and could have, for example, the shape of internal screw threading (see FIGS. 1B, 2 and 3) or external screw threading, a snap-in device, an interfitting male or female element provided with retention means, or the like.

The mounting of the attachment member 1 on the ribbed load-bearing elements 6 as effected at the ribs 7 of said load-bearing elements 6 by successive introduction of the straight rod portion 4 and the elbowed rod portion 5 in corresponding aligned openings 8, 9, previously provided in the side walls 10 delimiting the ribs 7, immediately adjacent the support surface 11 of the load-bearing elements 6.

This mounting operation consists more particularly in first introducing partially the straight rod portion 4 into one of the openings 8 or 9 existing in the lateral walls 10 of the rib 7 in question, then introducing entirely the free end 12 of the elbowed rod portion 5 into the opposite opening 9 or 8 (see FIG. 3) and, finally, emplacing the attachment member 1 by pivoting until the free end 12 of the elbowed rod portion 5 abuts against the internal surface of the wall portion of the load-bearing element 6 defining the support surface 11.

When the free end 12 is disposed in a plane perpendicular to the tubular body 2 containing the straight rod portion 4 and the part of the elbowed rod portion adjacent the tubular body 2, said tubular body 2 will extend perpendicularly relative to the load-bearing elements 6 after complete pivoting of the attachment member 1, this latter being limited by said free end 12.

In the case in which tractive and tearing forces are exerted on the tubular body 2 of an attachment member 1 mounted as described above, the anchoring element 4, 5 will bear on the portions of the wall of the load-bearing elements 6 defining the support surface 11, at the free end 12 and the part of the straight rod portion 4 introduced in the corresponding opening 8, 9 (see FIG. 4). As a result, there will be a distribution of said forces over a large surface of the wall of the load-bearing elements 6, particularly in the case of rod portions 4, 5 of square section, and, as a result, the intensity of traction forces applicable to the attachment member 1 according to the invention, without breaking the wall of the load-bearing elements 6, nor giving rise to tearing or destruction of said attachment member 1, is substantially greater than that of the forces which could be borne by the known securement means and described above.

The attachment member 1 could, as a function of the elements and/or securement members, be used either on the upper surface of the load-bearing elements 6, for securing elements and/or members resting on said load-bearing elements 6, or at the lower surface of this latter so as to hook on or suspend elements and/or members extending inwardly of the space covered by said load-bearing elements 6.

The present invention also has for its object a securement device for insulating panels 15 and a sealing covering 16, shown in FIG. 4 of the accompanying drawings, said securement device being principally constituted, on the one hand, by a base 1 secured to the supports or the load-bearing elements 6, in the form of an attachment member 1 described above, and, on the other hand, by an upper element 13 in the form of a plate provided with connection means 14 with said base 1 and for adjustment of its distance relative to the supports or load-bearing elements 6 (FIG. 4).

The connection means 14 could preferably be in the form of a screw-threaded rod adapted to coact with a tapped opening 3 provided in the upper portion of the tubular body 2 which is part of the attachment member 1.

Moreover, the element 13 preferably will be in the form of a disc, solid or provided with peripheral convex cutouts, comprising, as the case may be, at least one through opening, facilitating the handling of said element 13 during its emplacement on the attachment member 1.

The disc element 13 will preferably have a diameter comprised between about 15 cm and 20 cm according to the desired resistance to tearing, which depends also directly on the number of securement devices per unit surface area.

As shown in FIG. 4 of the accompanying drawings, the securement of the insulation panels 15 on the load-bearing elements 6 consists first in placing said insulation panels 15 on the load-bearing elements 6 and emplacing as desired the attachment members 1 by positioning them vertically, then in assembling the elements 13 in the shape of plates to said attachment members 1, by screwing with controlled force, so as to flatten the insulation panels 15 against the load-bearing elements 6, until the upper surface of said elements 13 in the shape of plates will be level with the upper surface of the adjacent insulation panels 15, the assembly thus constituting a flat uniform surface, without reinforcement, permitting effecting uniform and continuous cementing of the superficial sealing covering 16.

Thus, thanks to the invention, it is possible to provide a self-blocking attachment member 1 which can be secured rapidly and easily on load-bearing elements 6 of the type of preliminarily perforated ribbed sheet metal, without using mounting tools, and having a high resistance to tearing after emplacement.

Moreover, it is also possible to provide a securement device for insulation panels 15 and a sealing covering 16, particularly on the load-bearing elements 6, comprising particularly said attachment member 1. The use of the securement device described above does not require but a limited number of anchoring points per unit area of surface, while permitting obtaining a securement having high resistance to tractive and tearing forces.

Of course, the invention is not limited to the embodiment described and shown in the accompanying drawings. Modifications remain possible, particularly from the point of view of the construction of the various elements or by substitution of technical equivalents, without thereby departing from the scope of protection of the invention.

What is claimed is:

1. Attachment member adapted to be mounted on supports of ribbed sheet metal, comprising a tubular body (2) provided with connection means (3) and an anchoring element (4, 5) on one of the ends of said tubular body (2) and extending perpendicularly relative to said tubular body (2), said anchoring element being comprised by a straight rod portion (4) and an elbowed rod portion (5), of L shape, said straight rod portion (4) and said elbowed rod portion (5) being disposed on opposite sides of said tubular body (2).

2. Attachment member according to claim 1, wherein said connection means (3) are disposed at the end of the tubular body (2) opposite the anchoring element (4, 5).

3. Attachment member according to claim 1, wherein the anchoring element (4, 5) has a square section.

4. Securement device for insulation panels and a sealing covering on ribbed sheet metal load-bearing elements, comprising an attachment member (1) according to claim 1, and a plate (13) provided with means (14) for connection with said attachment member (1) and for adjusting its distance relative to the load-bearing elements (6).

5. Securement device according to claim 4, wherein said means (14) for connection and adjustment is in the form of a screw-threaded rod received in a screw-threaded opening (3) in an end of the tubular body (2) remote from said anchoring element.

6. Securement device according to claim 4, wherein said plate (13) is in the form of a disc comprising at least one through opening, facilitating the manipulation of said plate (13) during its emplacement on the attachment member (1).

* * * * *